United States Patent
Serban

(10) Patent No.: US 9,667,638 B2
(45) Date of Patent: *May 30, 2017

(54) USING A CONTENT DELIVERY NETWORK FOR SECURITY MONITORING

(71) Applicant: AT&T INTELLECTUAL PROPERTY I, L.P., Atlanta, GA (US)

(72) Inventor: Cristina Serban, Middletown, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/938,988

(22) Filed: Nov. 12, 2015

(65) Prior Publication Data

US 2016/0065602 A1    Mar. 3, 2016

Related U.S. Application Data

(63) Continuation of application No. 14/524,664, filed on Oct. 27, 2014, which is a continuation of application No. 12/547,659, filed on Aug. 26, 2009, now Pat. No. 8,874,724.

(51) Int. Cl.

| | |
|---|---|
| *G06F 15/177* | (2006.01) |
| *G06F 15/16* | (2006.01) |
| *H04L 29/06* | (2006.01) |
| *H04L 12/26* | (2006.01) |
| *H04L 29/08* | (2006.01) |
| *G06F 11/34* | (2006.01) |

(52) U.S. Cl.
CPC .......... *H04L 63/1416* (2013.01); *H04L 43/10* (2013.01); *H04L 63/1425* (2013.01); *H04L 67/2842* (2013.01); *G06F 11/3466* (2013.01); *G06F 2201/885* (2013.01); *H04L 67/1002* (2013.01)

(58) Field of Classification Search
CPC ........................ H04L 67/1002; H04L 67/2842
USPC ................................. 709/202, 224, 227–228
See application file for complete search history.

(56) References Cited

U.S. PATENT DOCUMENTS

| | | | |
|---|---|---|---|
| 5,864,659 A | 1/1999 | Kini | |
| 5,958,010 A | 9/1999 | Agarwal et al. | |
| 6,219,676 B1 * | 4/2001 | Reiner | ............... H04L 67/2852 |
| 6,513,060 B1 * | 1/2003 | Nixon | ................. H04L 41/0681 709/203 |
| 6,553,416 B1 * | 4/2003 | Chari | ................. H04L 41/0213 709/202 |
| 6,708,170 B1 * | 3/2004 | Byrne | ................ H04L 61/1523 |
| 6,711,687 B1 | 3/2004 | Sekiguchi | |
| 6,907,501 B2 | 6/2005 | Tariq et al. | |
| 7,426,546 B2 | 9/2008 | Breiter et al. | |
| 7,454,501 B2 * | 11/2008 | Wilcock | .................. H04L 29/06 709/223 |
| 7,657,622 B1 * | 2/2010 | Douglis | .............. H04L 41/5003 709/224 |
| 7,941,741 B1 | 5/2011 | Skillman | |

(Continued)

*Primary Examiner* — Hieu Hoang

(74) *Attorney, Agent, or Firm* — Akerman LLP; Michael K. Dixon; Mammen (Roy) P. Zachariah, Jr.

(57) ABSTRACT

A content delivery network includes a plurality of cache servers. Each cache server is configured to receive a request for content from a client system and receive content and security data from a content server. Each cache server is further configured to provide the content to the client system and provide the security data to a monitoring system.

20 Claims, 4 Drawing Sheets

(56) References Cited

U.S. PATENT DOCUMENTS

| | | | |
|---|---|---|---|
| 8,095,962 B2* | 1/2012 | Condon | G06F 21/577 380/247 |
| 8,607,328 B1* | 12/2013 | Hodges | G06F 21/568 713/165 |
| 8,676,958 B1* | 3/2014 | Hendon | H04L 43/0847 709/223 |
| 2002/0026563 A1* | 2/2002 | Chamberlain | G06F 17/30902 711/138 |
| 2002/0099818 A1* | 7/2002 | Russell | H04L 67/02 709/224 |
| 2003/0131091 A1* | 7/2003 | Ochiai | G06Q 10/10 709/223 |
| 2003/0135509 A1 | 7/2003 | Davis et al. | |
| 2003/0145038 A1 | 7/2003 | Bin Tariq et al. | |
| 2004/0073596 A1 | 4/2004 | Kloninger et al. | |
| 2004/0083283 A1 | 4/2004 | Sundaram et al. | |
| 2004/0193612 A1* | 9/2004 | Chang | G06F 17/30864 |
| 2005/0060579 A1 | 3/2005 | Dickelman et al. | |
| 2005/0193225 A1 | 9/2005 | Macbeth et al. | |
| 2006/0029104 A1 | 2/2006 | Jungck | |
| 2006/0075496 A1 | 4/2006 | Carpenter et al. | |
| 2006/0288119 A1 | 12/2006 | Kim et al. | |
| 2007/0027976 A1 | 2/2007 | Sasame et al. | |
| 2007/0124309 A1 | 5/2007 | Takase et al. | |
| 2007/0174426 A1* | 7/2007 | Swildens | H04L 12/14 709/217 |
| 2007/0214267 A1* | 9/2007 | Ogura | G06F 21/566 709/226 |
| 2008/0208961 A1 | 8/2008 | Kim et al. | |
| 2009/0063509 A1 | 3/2009 | Lockhart et al. | |
| 2013/0276120 A1 | 10/2013 | Dalcher et al. | |

* cited by examiner

USING A CONTENT DELIVERY NETWORK FOR SECURITY MONITORING

CROSS REFERENCE TO RELATED APPLICATIONS

This application is a continuation of and claims the benefit of U.S. patent application Ser. No. 14/524,664 filed Oct. 27, 2014, which is a continuation of U.S. patent application Ser. No. 12/547,659 filed Aug. 26, 2009, now U.S. Pat. No. 8,874,724, which are both hereby incorporated by reference in their entireties.

FIELD OF THE DISCLOSURE

The present disclosure generally relates to communications networks, and more particularly relates to using a content delivery network (CDN) for security monitoring.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to a cache server situated closer to the client issuing the request. CDNs either co-locate cache servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
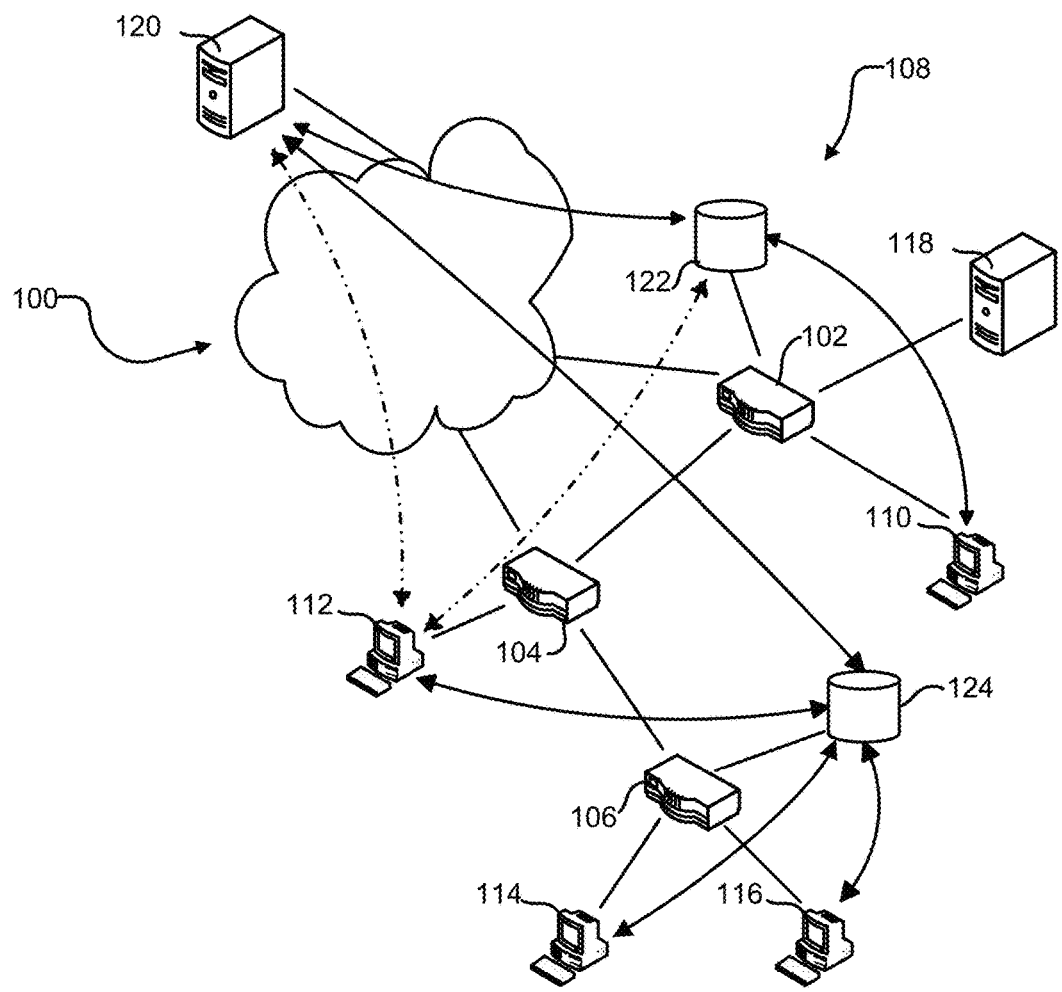
FIG. 1 is a block diagram illustrating a communications network in accordance with one embodiment of the present disclosure.

FIG. 1 shows a geographically dispersed network 100, such as the Internet. Network 100 can include routers 102, 104, and 106 that communicate with each other and form an autonomous system (AS) 108. AS 108 can connect to other ASs that form network 100 through peering points at routers 102 and 104. Additionally, AS 108 can include client systems 110, 112, 114, and 116 connected to respective routers 102, 104, and 106 to access the network 100. Router 102 can provide ingress and egress for client system 110. Similarly, router 104 can provide ingress and egress for client system 112. Router 106 can provide ingress and egress for both of client systems 114 and 116.

AS 108 can further include a Domain Name System (DNS) server 118. DNS server 118 can translate a human readable hostname, such as www.att.com, into an Internet Protocol (IP) address. For example, client system 110 can send a request to resolve a hostname to DNS server 118. DNS server 118 can provide client system 110 with an IP address corresponding to the hostname. DNS server 118 may provide the IP address from a cache of hostname-IP address pairs or may request the IP address corresponding to the hostname from an authoritative DNS server for the domain to which the hostname belongs.

Client systems 110, 112, 114, and 116 can retrieve information from a server 120. For example, client system 112 can retrieve a web page provided by server 120. Additionally, client system 112 may download content files, such as graphics, audio, and video content, and program files such as software updates, from server 120. The time required for client system 112 to retrieve the information from the server 120 normally is related to the size of the file, the distance the information travels, and congestion along the route. Additionally, the load on the server 120 is related to the number of client systems 110, 112, 114, and 116 that are actively retrieving information from the server 120. As such, the resources such as processor, memory, and bandwidth available to the server 120 limit the number of client systems 110, 112, 114, and 116 that can simultaneously retrieve information from the server 120.

Additionally, the network can include cache servers 122 and 124 that replicate content on the server 120 and that can be located more closely within the network to the client systems 110, 112, 114, and 116. Cache server 122 can link to router 102, and cache server 124 can link to router 106. Client systems 110, 112, 114, and 116 can be assigned cache server 122 or 124 to decrease the time needed to retrieve information, such as by selecting the cache server closer to the particular client system. The network distance between a cache server and client system can be determined by network cost and access time. As such, the effective network distance between the cache server and the client system may be different from the geographic distance.

When assigning cache servers 122 and 124 to client systems 110, 112, 114, and 116, the cache server closest to the client can be selected. The closest cache server may be the cache server having a shortest network distance, a lowest network cost, a lowest network latency, a highest link capacity, or any combination thereof. Client system 110 can be assigned cache server 122, and client systems 114 and 116 can be assigned to cache server 124. The network costs of assigning client system 112 to either of cache server 122 or 124 may be substantially identical. When the network costs associated with the link between router 102 and router 104 are marginally lower than the network costs associated with the link between router 104 and router 106, client 112 may be assigned to cache server 124.

Client system 112 may send a request for information to cache server 124. If cache server 124 has the information stored in a cache, it can provide the information to client system 112. This can decrease the distance the information travels and reduce the time to retrieve the information. Alternatively, when cache server 124 does not have the information, it can retrieve the information from server 120 prior to providing the information to the client system 112. In an embodiment, cache server 124 may attempt to retrieve the information from cache server 122 prior to retrieving the information from server 120. The cache server 124 may retrieve the information from the server 120 only once, reducing the load on server 120 and network 100 such as, for example, when client system 114 requests the same information.

Cache server 124 can have a cache of a limited size. The addition of new content to the cache may require old content to be removed from the cache. The cache may utilize a least recently used (LRU) policy, a least frequently used (LFU) policy, or another cache policy known in the art. When the addition of relatively cold or less popular content to the cache causes relatively hot or more popular content to be removed from the cache, an additional request for the relatively hot content can increase the time required to provide the relatively hot content to the client system, such as client system 114. To maximize the cost and time savings of providing content from the cache, the most popular content may be stored in the cache, while less popular content is retrieved from server 120.

Figure 2:
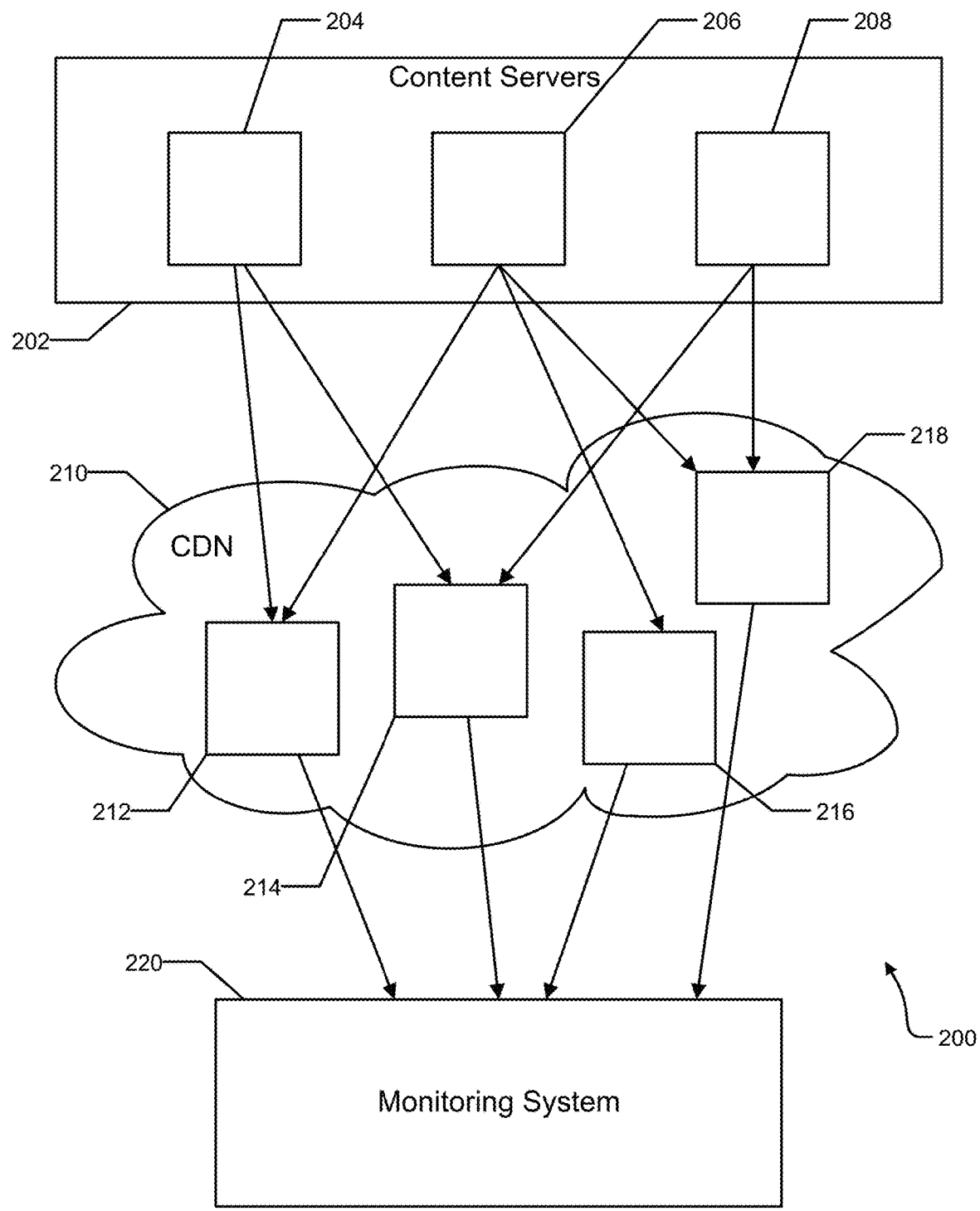
FIG. 2 is a block diagram illustrating an exemplary system for security monitoring.

FIG. 2 illustrates an exemplary system, generally designated 200, for security monitoring. Content Provider 202 can have content servers 204, 206, and 208 for providing content. In an embodiment, content servers 204, 206, and 208 can be geographically distributed to reduce the likelihood of simultaneous failure. CDN 210 can include cache servers 212, 214, 216, and 218 for providing the content to client systems, such as client system 112. The cache servers 212, 214, 216, and 218 can retrieve content from the content servers 204, 206, and 208 in response to a request from a client system. Alternatively, content servers 204, 206, and 208 can upload content to the cache servers 212, 214, 216, and 218 when new content is created or content is updated. Additionally, the content servers 204, 206, and 208 can provide security data along with any content sent to cache servers 212, 214, 216, and 218.

The security data can be a data file including information from system logs, configuration information, system information, and the like. The configuration information can include the size of configuration files, last modification time of the configuration files, hashes of the configuration files, recent changes to the configuration files, or any combination thereof. System information can include CPU utilization, bandwidth utilization, storage utilization, number of concurrent connections, processor temperature, fan speed, drive status such as Self Monitoring Analysis and Reporting Technology (S.M.A.R.T.) information, other indicators of the current operation of the content server, or any combination thereof.

Monitoring system 220 can retrieve the security data from the cache servers 212, 214, 216, and 218 to identify any changes in the operation of the content servers 204, 206, and 208. These changes can be due to malicious activity, configuration changes, hardware malfunctions, or the like. For example, the monitoring system 220 can compare the security data obtained from different cache servers and comparing the security data to historical trends to identify anomalies that may indicate problems with one of the content servers. Additionally, the monitoring system 220 can monitor changes to configuration files for unauthorized activity. Further, the monitoring system 220 can analyze the log files to identify system errors or malicious attempts at accessing the content server.

In an embodiment, cache server 212 can obtain security data from content server 204. The security data obtained by cache server 212 can include information from a log file containing an entry stating that at time 2:05:09 an event X was observed. Separately, cache server 214 can obtain security data from content server 204. The security data obtained by cache server 214 can include information from a log file containing an alternate entry for time 2:05:09 stating that event Y (different from X) was observed. Alternatively, the security data obtained by cache server 214, while encompassing a period of time including 2:05:09, may not have an entry for time 2:05:09. The monitoring system 220, when comparing the security data obtained from cache servers 212 and 214, can detects the difference as an anomaly and can generate an alert to indicate a potential compromise leading to the event at 2:05:09 being changed or deleted occurred on content server 204 between the time cache server 212 obtained the security data and the time the cache server 214 obtained the security data. In an embodiment, network hardware, such as routers, intrusion detection systems, network attached storage systems, and the like, can send logging information to one of the content servers and the content server can include that information with the security data sent to the cache servers.

Figure 3:
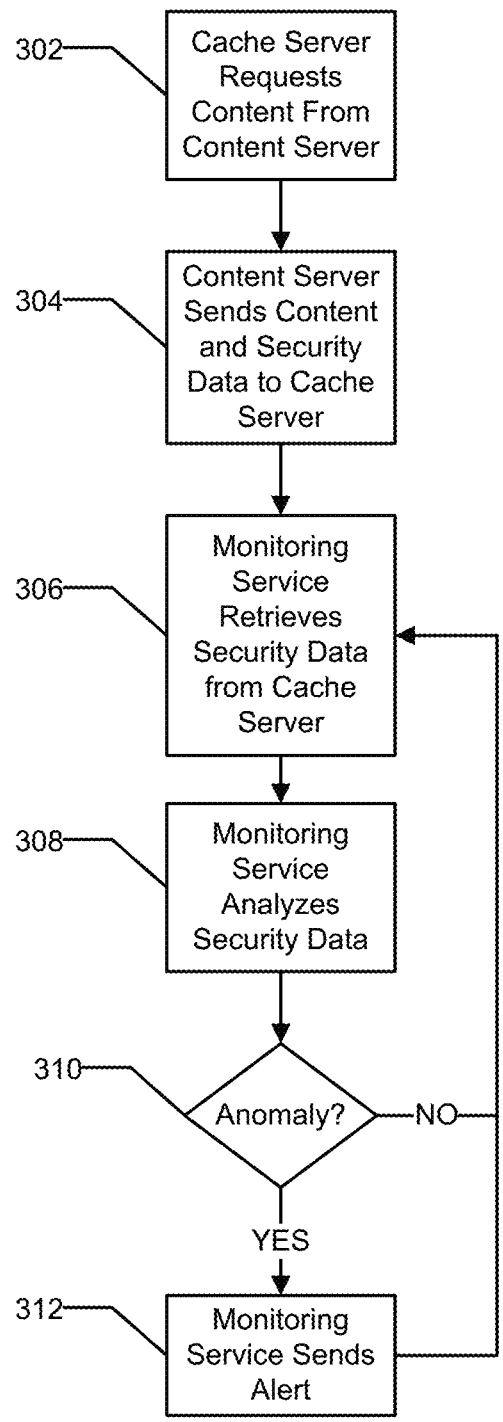
FIG. 3 is a flow diagram illustrating an exemplary method of using a CDN for security monitoring.

FIG. 3 illustrates an exemplary method of using a CDN for security monitoring. At 302, a cache server, such as cache server 212, can request content from a content server, such as content server 204. The request can be in response to the cache server receiving a request for the content from a client system and determining that the content is not cached or is out-of-date. At 304, the content server can provide the cache server with the content and a separate data file containing security data. The security data can include recent log activity, system resource utilization, recent changes to configuration files, or any combination thereof.

In an alternate embodiment, the content server can initiate the transfer of new content, such as when an update is made to a file having a long time-to-live value or when a software update for client systems is released. The content server can send security data at substantially the same time as sending the new content. Generally, the security data can be transferred to the cache server whenever the content server sends content to the cache server.

At 306, the monitoring service, such as monitoring service 220, can retrieve the security data from the cache server. The monitoring service can periodically poll the cache server to determine if new security data is available from the cache server. Additionally, the monitoring service can retrieve security data from multiple cache servers.

At 308, the monitoring service can analyze the security data. For example, the monitoring service can compare the security data of a similar time period retrieved from different cache servers. A difference in security data covering a similar time period, such as recent log activity, could indicate an attacker was able to gain access to the content server and altered the logs in an attempt to avoid detection. In another example, the monitoring service could compare system resource utilization to historical patterns of system resource utilization. A significant change in the system resource utilization could indicate an ongoing denial-of-service attack or an attacker scanning for vulnerabilities. Alternatively, abnormal system resource utilization may indicate a configuration or hardware problem that should be addressed before it causes a system failure.

At 310, the monitoring service can determine if an anomaly is detected. When an anomaly is detected, the monitoring service can send an alert such as to a system administrator or network security specialist, as shown at 312. The anomaly can include altered logs files, modified configuration files, changes in resource utilization outside of normal usage patterns, or the like. Additionally, the monitoring server may attempt to disconnect a compromised server from the network to prevent the attack from further compromising the system. The monitoring server can also activate logging hardware within the network to record network activity for further analysis. The monitoring service can continue to monitor the content server by retrieving additional security data, as illustrated at 306. Alternatively, when an anomaly is not detected, the monitoring service can, without sending an alert, retrieve additional security data from the cache servers, as illustrated at 306.

Figure 4:
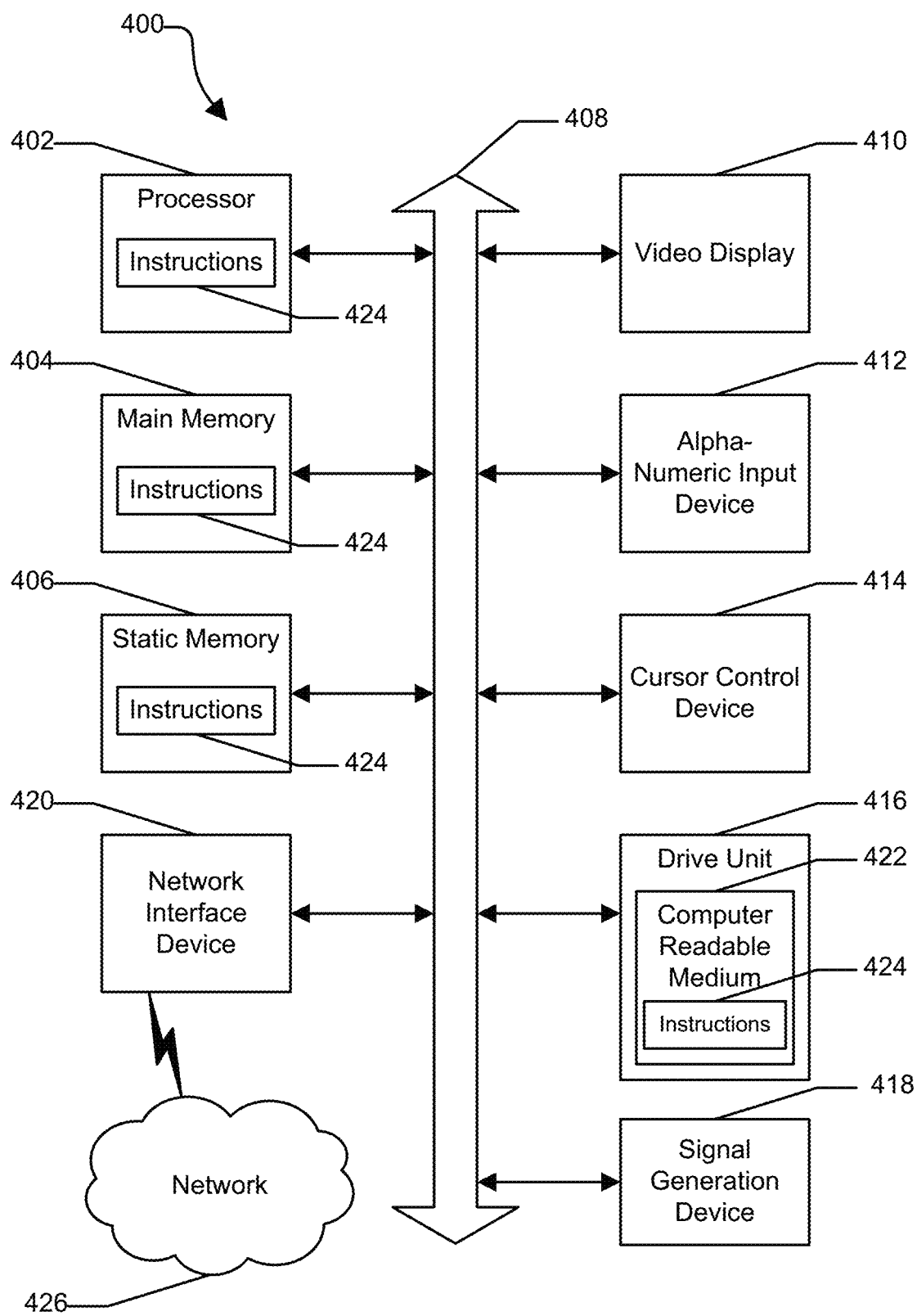
FIG. 4 is an illustrative embodiment of a general computer system.

FIG. 4 shows an illustrative embodiment of a general computer system 400. The computer system 400 can include a set of instructions that can be executed to cause the computer system to perform any one or more of the methods or computer based functions disclosed herein. The computer system 400 may operate as a standalone device or may be connected, such as by using a network, to other computer systems or peripheral devices. Examples of the general computer system can include content server 204, cache server 122, client system 212, router 104, monitoring system 220, and the like.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

The computer system 400 may include a processor 402, such as a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410 such as a liquid crystal display (LCD), an organic light emitting diode (OLED), a flat panel display, a solid-state display, or a cathode ray tube (CRT). Additionally, the computer system 400 may include an input device 412 such as a keyboard, and a cursor control device 414 such as a mouse. Alternatively, input device 412 and cursor control device 414 can be combined in a touchpad or touch sensitive screen. The computer system 400 can also include a disk drive unit 416, a signal generation device 418 such as a speaker or remote control, and a network interface device 420 to communicate with a network 426. In a particular embodiment, the disk drive unit 416 may include a computer-readable medium 422 in which one or more sets of instructions 424, such as software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the Figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system, comprising:
a memory that stores instructions; and
a processor that executes the instructions to perform operations, the operations comprising:

determining, based on a first security data file received from a first cache server and based on a comparison of the first security data file with a second security data file received from a second cache server, if a change in operation of a content server has occurred, wherein the first security data file is provided to the first cache server by the content server and is cached at the first cache server, wherein the second security data file is provided to the second cache server by the content server and is cached at the second cache server, wherein the first security data file includes first security data associated with the content server, and wherein the second security data file includes second security data associated with the content server; and generating an alert if the change in the operation of the content server is determined to have occurred.

2. The system of claim 1, wherein the operations further comprise determining that the change in the operation of the content server has occurred based on a configuration change indicated by the comparison.

3. The system of claim 1, wherein the operations further comprise determining that the change in the operation of the content server has occurred based on malicious activity detected based on the comparison.

4. The system of claim 1, wherein the operations further comprise determining that the change in the operation of the content server has occurred based on a hardware malfunction detected based on the comparison.

5. The system of claim 1, wherein the operations further comprise receiving a request for content from a client system.

6. The system of claim 5, wherein the operations further comprise receiving, in response to receiving the request for the content, the content and the first security data file from the content server.

7. The system of claim 6, wherein the operations further comprise caching the content at the first cache server after receiving the content from the content server.

8. The system of claim 7, wherein the operations further comprise providing the content to the client system.

9. The system of claim 1, wherein the operations further comprise identifying the change in the operation of the content server.

10. The system of claim 1, wherein the operations further comprise disconnecting the content server from a network if the change in the operation of the content server is determined to have occurred.

11. The system of claim 1, wherein the operations further comprise activating, after detecting an anomaly based on the first security data file, logging hardware to record network activity.

12. The system of claim 1, wherein the operations further comprise monitoring the content server if the change in the operation of the content server is determined to have occurred.

13. The system of claim 1, wherein the operations further comprise determining that the change in the operation of the content server has occurred based on comparing the first security data file to a historical trend associated with the content server.

14. A method, comprising:
determining, based on a first security data file received from a first cache server and based on a comparison of the first security data file with a second security data file received from a second cache server, if a change in operation of a content server has occurred, wherein the determining is performed by utilizing instructions from a memory that are executed by a processor, wherein the first security data file is provided to the first cache server by the content server and is cached at the first cache server, wherein the second security data file is provided to the second cache server by the content server and is cached at the second cache server, wherein the first security data file includes first security data associated with the content server, and wherein the second security data file includes second security data associated with the content server; and transmitting an alert if the change in the operation of the content server is determined to have occurred.

15. The method of claim 14, further comprising generating the alert if the change in the operation of the content server is determined to have occurred.

16. The method of claim 14, further comprising analyzing a log file to identify a system error associated with the content server.

17. The method of claim 14, further comprising monitoring a configuration file to detect unauthorized activity associated with the content server.

18. The method of claim 14, further comprising monitoring the content server if the change in the operation of the content server is determined to have occurred.

19. The method of claim 14, further comprising activating, after detecting an anomaly based on the first security data file, logging hardware to record network activity associated with the content server.

20. A computer-readable device comprising instructions, which, when loaded and executed by a processor, cause the processor to perform operations, the operations comprising:
determining, based on a first security data file received from a first cache server and based on a comparison of the first security data file with a second security data file received from a second cache server, if a change in operation of a content server has occurred, wherein the first security data file is provided to the first cache server by the content server and is cached at the first cache server, wherein the second security data file is provided to the second cache server by the content server and is cached at the second cache server, wherein the first security data file includes first security data associated with the content server, and wherein the second security data file includes second security data associated with the content server; and transmitting an alert if the change in the operation of the content server is determined to have occurred.

* * * * *